United States Patent
Naccache et al.

(10) Patent No.: US 10,755,253 B2
(45) Date of Patent: Aug. 25, 2020

(54) METHOD FOR PROCESSING DATA ON A MULTIMEDIA PAYMENT KIOSK, CORRESPONDING DEVICES AND COMPUTER PROGRAMS

(71) Applicant: INGENICO GROUP, Paris (FR)

(72) Inventors: David Naccache, Paris (FR); Remi Geraud, Paris (FR); Pierre Quentin, Paris (FR); Vincent Ducrohet, Voisins le Bretonneux (FR); Christian Delord, Saint Cloud (FR)

(73) Assignee: INGENICO GROUP, Paris (FR)

( * ) Notice: Subject to any disclaimer, the term of this patent is extended or adjusted under 35 U.S.C. 154(b) by 308 days.

(21) Appl. No.: 15/771,894

(22) PCT Filed: Oct. 21, 2016

(86) PCT No.: PCT/EP2016/075476
§ 371 (c)(1),
(2) Date: Apr. 27, 2018

(87) PCT Pub. No.: WO2017/072056
PCT Pub. Date: May 4, 2017

(65) Prior Publication Data
US 2018/0308080 A1    Oct. 25, 2018

(30) Foreign Application Priority Data
Oct. 27, 2015  (FR) ...................................... 15 60271

(51) Int. Cl.
*G06Q 20/18*    (2012.01)
*G06Q 30/02*    (2012.01)
(Continued)

(52) U.S. Cl.
CPC ............. *G06Q 20/18* (2013.01); *G06Q 20/20* (2013.01); *G06Q 20/204* (2013.01); *G06Q 20/32* (2013.01);
(Continued)

(58) Field of Classification Search
CPC .................................................. G06Q 30/0271
See application file for complete search history.

(56) References Cited

U.S. PATENT DOCUMENTS 6,694,300 B1 * 2/2004 Walker .................. G06Q 30/02
                                                  705/14.25
9,195,984 B1 * 11/2015 Spector .............. G06Q 20/3821
(Continued)

FOREIGN PATENT DOCUMENTS

JP       2011203952 A    10/2011

OTHER PUBLICATIONS

International Search Report and Written Opinion dated Jan. 10, 2018 for International Application No. EP/2016/075476, filed Oct. 21, 2016.
(Continued)

*Primary Examiner* — A. Hunter Wilder
(74) *Attorney, Agent, or Firm* — David D. Brush; Westman, Champlin & Koehler, P.A.

(57) ABSTRACT

A method is provided for processing data displayed on a screen of a multimedia kiosk, which has a contactless payment terminal. The method is implemented within the multimedia kiosk and includes detecting a presence of a user; and modifying, by using an interactive management module, a common advertisement message, broadcast by the multimedia kiosk, into a personalized advertisement.

21 Claims, 2 Drawing Sheets

(51) Int. Cl.
  *G06Q 20/32* (2012.01)
  *G06Q 20/20* (2012.01)
  *H04W 4/80* (2018.01)

(52) U.S. Cl.
  CPC ....... *G06Q 20/327* (2013.01); *G06Q 30/0268* (2013.01); *G06Q 30/0271* (2013.01); *H04W 4/80* (2018.02); *H04L 2463/102* (2013.01)

(56) References Cited

U.S. PATENT DOCUMENTS

| | | | |
|---|---|---|---|
| 9,619,831 B1* | 4/2017 | Kumar | ............... G06Q 30/0631 |
| 2008/0249859 A1* | 10/2008 | Angell | ................... G06Q 30/02 705/14.39 |
| 2011/0144801 A1 | 6/2011 | Selker et al. | |
| 2013/0041822 A1* | 2/2013 | Wagner | ............... G06Q 20/382 705/44 |
| 2013/0054016 A1 | 2/2013 | Canter et al. | |
| 2015/0248702 A1 | 9/2015 | Chatterton | |
| 2016/0044442 A1* | 2/2016 | Pacelli | ............... G06Q 20/3224 455/41.1 |

OTHER PUBLICATIONS

English Translation of the International Search Report and Written Opinion dated Jan. 10, 2018 for International Application No. EP/2016/075476, filed Oct. 21, 2016.
Tim Hornyak: "Vending machine watches you, offers drink advice—CNET", CNET, Oct. 8, 2010 (Oct. 8, 2010), XP055294690.
Kiran S. Kadambi et al.: "Near-field communication-based secure mobile payment service", Proceedings of the 11th International Conference on Electronic Commerce, ICEC '09, Jan. 1, 2009 (Jan. 1, 2009), p. 142, XP055052573.
Nemanja Memarovic et al: "Beyond Web 2.0: Challenges in Personalizing for Networked Public Display Environments", Pervasive 2010 Workshop, May 17, 2010 (May 17, 2010), XP055294573.
Tom Kaneshige: "Proximity-Based Advertising Closer Than You Think : CIO", CIO, Jan. 22, 2015 (Jan. 22, 2015), XP055294489.

* cited by examiner

METHOD FOR PROCESSING DATA ON A MULTIMEDIA PAYMENT KIOSK, CORRESPONDING DEVICES AND COMPUTER PROGRAMS

CROSS-REFERENCE TO RELATED APPLICATIONS

This Application is a Section 371 National Stage Application of International Application No. PCT/EP2016/075476, filed Oct. 21, 2016, which is incorporated by reference in its entirety and published as WO 2017/072056 A1 on May 4, 2017, not in English.

1. FIELD OF THE INVENTION

The proposed technique relates to the transmission of data by merchants to users. The proposed technique relates more specifically to the adapting of the supply of products or services to specific devices and independent sales points. The proposed technique also relates to the transmission, by a merchant to a user, of data representing information about a purchase made by the user from the merchant.

2. PRIOR ART

Communications between a merchant and a user are an indispensable element in making a purchase. The merchant must first communicate his offer (a physical or virtual product and a price). The user signifies acceptance and makes payment, for example by using his bank card. Subsequently, the merchant provides a receipt in the form of a slip that indicates the amount of the payment and the product or the service purchased. This receipt firstly confirms the amount that has in fact been invoiced and serves as proof of purchase and secondly enables the merchant to give the user information on the product that has effectively been purchased.

The receipt is a carrier of information in paper form. Merchants have to be equipped with a printer or a terminal integrating a printer to print out these receipts. The purchase and maintenance of the printers or terminals is an additional expense for merchants. In addition, the massive use of paper presents an ecological problem.

At the same time, the modes of selling products and services are evolving and enabling users to make purchases in simplified ways. These modes of selling have common aspects:

speed of choice of product and of payment, targeting impulse purchases;
the capacity to make transactions with high utilization peaks;
sales points reduced to the utmost, enabling speedy deployment in heterogeneous environments;
sales points that reduce the total cost of ownership (TCO)

To cover all these sales points, payment can be integrated into a digital screen: this is for example the case with the digital advertising screens which are increasingly found in shopping malls, railway stations, airports and even in the street. Such a technique of integration enables the display on the screen of an advertisement to promote a product. An independent payment terminal, integrated to make contactless payment (NFC or other electronic contactless payment means) can also be present. In these examples of use, it is especially necessary to provide a receipt (a ticket) after each purchase by the users. Indeed, for purchases of intangible items (for example a movie ticket) information must be provided enabling users to access the product (time, cinema-hall and place). For purchases of physical products, it is necessary to indicate the means by which users can obtain the products or provide their addresses for the dispatch of the products. More generally, it is necessary to communicate with the user.

For questions of costs, the advertisement screens equipped with payment means are made available by an advertising agency or authority. This advertising agency has various means for the commercial distribution of the advertisement space that it sells. By contrast, to date, the advertising agency does not have means available to increase the efficiency of the interaction conducted with the user.

There is therefore a need for a solution that enables the communication of information to users before, during and after purchases and that responds to problems of complexity, cost, speed and security proper to the independent payment terminals integrated into interactive advertisement kiosks.

3. SUMMARY OF THE INVENTION

The proposed technique does not have at least some of the problems of the prior art. More particularly, the proposed technique relates to a method for processing data displayed on a screen of a multimedia kiosk comprising a contactless payment terminal, said method being implemented within said multimedia kiosk, method characterized in that it comprises:

a step for detecting a presence of a user;
a step of modification, by means of an interactive management module, of a common advertisement message broadcast by said multimedia kiosk into a personalized or customized advertisement message.

Thus, the multimedia kiosk is not limited to the role of a simple tool for broadcasting or disseminating an advertisement message but can also act as a tool of interaction with the user.

According to one particular characteristic, said method furthermore comprises at least one step for implementing a payment transaction by means of the contactless payment terminal for the purchase of a product or a service subsequently to the display of a personalized advertisement message to said user.

According to one particular characteristic, the implementing of a transaction comprises:

a step of reception, by the interaction management module, of a piece of data representing a user's willingness to make a purchase related to the personalized advertisement message;
a step of transmission, to a processing server, of data for creating an acceptance profile;
a step for receiving said acceptance profile;
a step for transmitting said acceptance profile to said contactless payment terminal;
a step for the obtaining, by the contactless payment terminal and coming from a payment means of the user, of data necessary to make a payment;
a step of instantiation of a transaction by the contactless payment terminal.

Thus, the multimedia kiosk is capable of directly implementing a payment operation as a function of a personalized message presented to the user. This means that the user can make purchases directly from the multimedia kiosk.

According to one particular characteristic, the method comprises the implementation of the transaction by the processing server in coordination with a bank server.

Thus, the transaction is managed by a processing server. This means that the security of the transaction is increased through precautions taken against a hacking of the multimedia kiosk.

According to one particular characteristic, the implementation of the transaction by the processing server in coordination with the bank server comprises:
- a step of reception of the transaction by the processing server;
- a step of transmission of the transaction by the processing server to a bank server;
- a step of processing of the received transaction by the bank server; and
- a step of transmission by the bank server of the progress of the transaction.

Thus, the transaction of payment for the product or the service is implemented within a secured communications network According to one particular characteristic, the step of modification of a common advertisement message into a personalized advertisement message comprises the display of a prompt asking the user to purchase the item of goods or the services being promoted.

According to one particular characteristic, the step for modifying a common or general advertisement message into a personalized advertisement message comprises:
- a step for detecting the presence of a smart communications terminal;
- a step for transmitting a request for obtaining data to the communications terminal; and, when the user accepts the transmission of data:
- a step for modifying said advertisement message as a function of at least one value derived from said received data.

According to one particular characteristic, said step of detection comprises a step for obtaining a signal coming from at least one presence sensor of the multimedia kiosk.

According to one particular characteristic, the implementing of a transaction comprises a step of display, on the screen of said multimedia kiosk, of a piece of data expressing the purchase made by said user.

According to one particular characteristic, subsequently to the step for obtaining the data (DAT) needed to implement the payment, the method comprises:
- a step of instantiation of a time-out of a pre-determined duration;
- a step of display of a message providing information on the possibility of cancelling the transaction up to the occurrence of either of the following events:
  - the reception, by the payment terminal, coming from a payment means of the user, of the same data (DAT) as the data previously used to implement the payment;
  - the elapsing of the time limit defined by the time-out.

Thus, during a pre-determined period, the user has the possibility of canceling the transaction by using the same payment means as those that he had used previously.

According to one particular characteristic, when the payment terminal receives the same data (DAT) as the data previously used to implement the payment, the method comprises a step of cancellation of said transaction.

According to another aspect, the present technique also relates to a multimedia kiosk comprising means for the display of data on a screen and comprising a contactless payment terminal. Such a kiosk comprises inter alia:
- means of detection of a presence of a user;
- means of modification, by means of an interaction management module, of a common advertisement message broadcast by said multimedia kiosk into a personalized advertisement message.

According to a preferred implementation, the different steps of the method according to the proposed technique are implemented by one or more software programs or computer programs comprising software instructions to be executed by a data processor of a relay module according to the proposed technique, designed to command the execution of the different steps of the methods.

The invention is therefore also aimed at providing a program capable of being executed by a computer or by a data processor, this program comprising instructions to command the execution of the steps of a method as mentioned here above.

This program can use any programming language whatsoever and be in the form of source code, object code or intermediate code between source code and object code such as in a partially compiled form or in any other desirable form whatsoever.

The proposed technique is also aimed at providing an information carrier or medium readable by a data processor and comprising instructions of a program as mentioned here above.

The information carrier can be any entity or device whatsoever capable of storing the program. For example, the carrier can comprise a storage means such as a ROM, for example, a CD ROM or a microelectronic circuit ROM or again a magnetic recording means, for example a floppy disk or a hard disk drive.

Furthermore, the information carrier can be a transmissible carrier such as an electrical or optical signal that can be conveyed via an electrical or optical cable, by radio or by other means. The program according to the proposed technique can especially be uploaded to an Internet type network.

As an alternative, the information carrier can be an integrated circuit into which the program is incorporated, the circuit being adapted to executing or to being used in the execution of the method in question.

According to one embodiment, the proposed technique is implemented by means of software and/or hardware components. In this respect, the term "module" can correspond, in this document, equally well to a software component and to a hardware component or to a set of hardware and software components.

A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, gateway, router etc) and is capable of accessing hardware resources of this physical entity (memories, recording media, communications buses, input/output electronic boards, user interfaces etc).

In the same way, a hardware component corresponds to any element of a hardware assembly capable of implementing a function or a set of functions according to what is described here below for the module concerned. It can be a programmable hardware component or a component with an integrated processor for the execution of software, for example, an integrated circuit, a smart card, a memory card, an electronic board for the execution of a piece of firmware etc.

Each component of the system described here above implements of course its own software modules.

The different embodiments mentioned here above can be combined with one another to implement the invention.

4. FIGURES

Other features and advantages of the invention shall appear more clearly from the following description of a particular embodiment of the disclosure, given by way of a simple illustrative and non-exhaustive example and from the appended drawings, of which:

5. DESCRIPTION

5.1. General Principle

Figure 1:
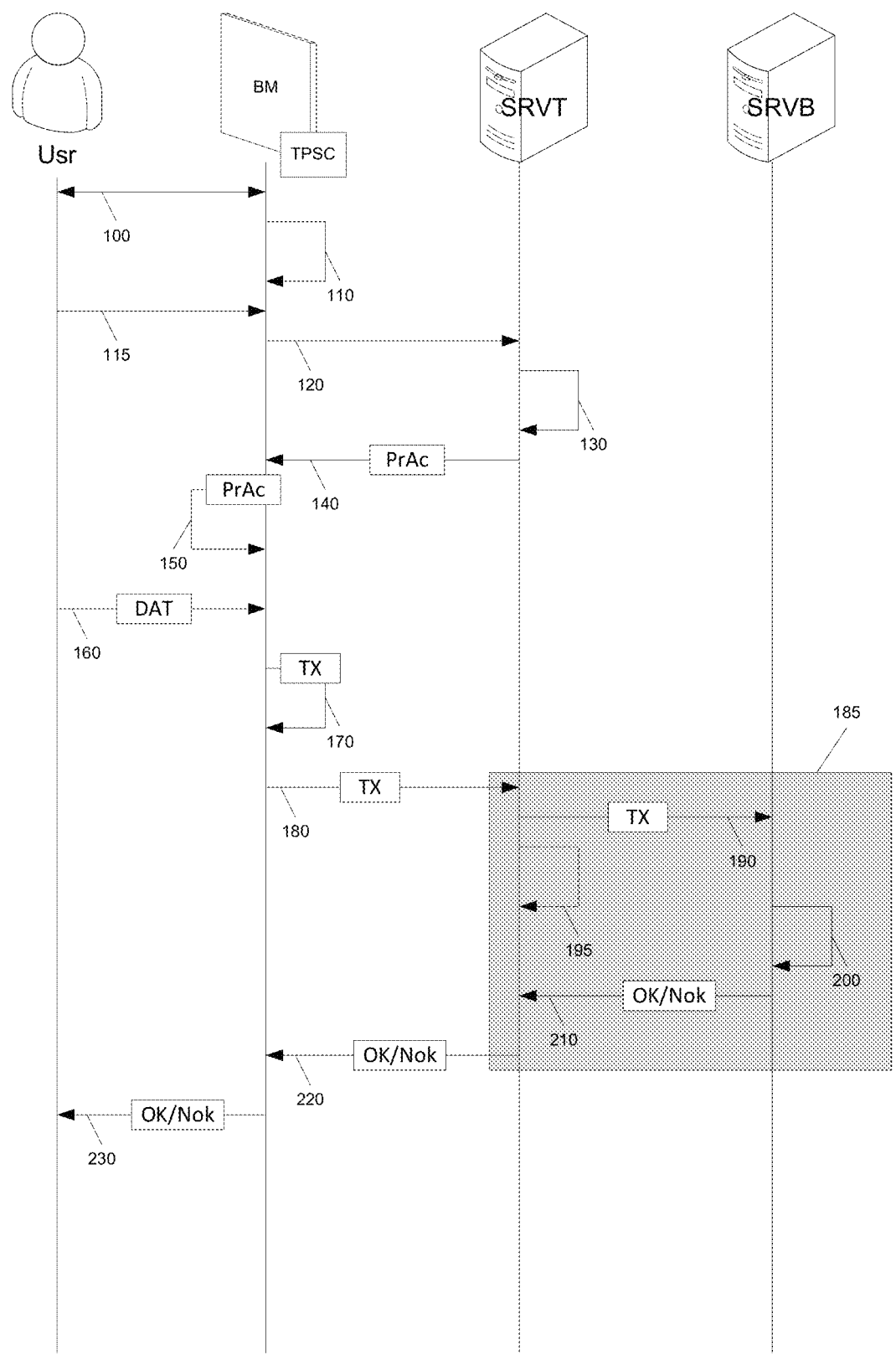
FIG. 1 is a sequence diagram of the data-processing method.

In the prior art, it is complicated and costly for an entity that manages advertisement resources (such as an advertisement agency) to implement interaction with an end customer (called a user). The fact is that the advertisement resource management entities are generally in contact with advertisers (merchants) who wish to promote products and services and are not directly linked to the end users.

The general principle of the proposed technique consists in enabling interaction between end users and a merchant through an entity for managing advertisement resources (an advertisement resource management entity). To this end, the advertisement resource management entity sets up a kiosk compliant with the present technique and described here below. More specifically, such a kiosk can also be called a multimedia payment kiosk or a multimedia promotion kiosk. It comprises a screen which may be touch screen. The kiosk also comprises a payment terminal (for example an independent terminal) of the contactless payment terminal type. Such a kiosk also comprises a processor, a random-access memory, and a mass storage memory and a (wired type) network communications interface. In addition, depending on the embodiments, such a kiosk also has one or more wireless connection modules (Bluetooth or direct Wi-Fi). Within the framework of the present invention, a distinction is made between a wireless communications interface enabling interaction with a hardware device available to the user (for example a smartphone type of smart communications terminal) and a contactless interface (of the NFC type) enabling the transmission and reception of data coming from a payment means (for example a contactless bank card). These two types of interface should not and cannot be mistaken for each other.

According to the present technique, such a multimedia kiosk also comprises an interaction management module. Such an interaction management module, which can be a hardware module or a software module, is in charge of adapting the operation of the multimedia kiosk to specific values which are notably linked to:

the type of advertisement message displayed on the multimedia kiosk;

signals coming from a proximity sensor or presence sensor, such a sensor being capable of measuring the presence or absence of a person before the multimedia kiosk; depending on the detection technology used for this sensor, it is also possible to determine the number of persons present before the screen.

In general, such a multimedia kiosk is thus capable of adapting its operation in relation to:

the place where the kiosk is set up (railway station, subway station, airport, shopping mall, sales point);

the time of day: for example during heavy peak hours in a railway station or subway station (at the place where the kiosk is set up), the operation of the kiosk can be limited to a simple dynamic display (because there is little likelihood of a user being interested in purchasing a product or service); conversely, during the off-peak times, the kiosk can adapt its operation to enable the purchase of the item or the services;

external public data (weather, traffic, events): for example, when the kiosk receives a piece of information about extreme heat, advertisement messages relating to the sale of products for rainy weather can be omitted;

the type of user interaction (payment card, loyalty card, smartphone etc.): the kiosk is capable, through wireless connection modules, of detecting a presence of a smart communications terminal if there is one; if such terminal is present before the kiosk, then the can adapt its operation to take account of the presence of the terminal;

possible data stored and accessible in the user's communications terminal in using a short-distance data exchange protocol (NFC, BLE etc.): for example, if an advertisement message identical or similar to an advertisement message that can be displayed by the kiosk is detected (in the advertisement cache of the smart terminal or again by obtaining cookies from the smart terminal), the terminal can display the identical message that it possesses itself in order to relay that of the user's terminal;

the number of persons standing before the multimedia kiosk;

transactions possibly made beforehand: the kiosk can be provided with a specific memory (i.e. private data) of the products purchased and for example more frequently propose the most sold products or services or it can display the number of seats remaining for a show etc.;

the list of products/prices proposed can be updated either regularly and automatically (pull operation) or by receiving updates (push operation) for example in sending a specific request addressed to a processing server to which the kiosk is connected by means of its network interface.

The present technique also relates to a processing server of the payment service provider server type. Such a processing server is implemented on the one hand to process the requests coming from the multimedia kiosk. Such requests are divided into two distinct categories: they are firstly updating requests. These updating requests are used to carry out remote updating operations on the interactive kiosk. Depending on the embodiments and the operational conditions, these updating requests are directly processed by the processing server (in which case the processing server possesses or can acquire the data needed for updating the interactive kiosk) or indirectly by transmitting this request to a server of an advertising agency in charge of carrying out the updating operations on the multimedia kiosk.

These two embodiments differ essentially in the architecture of the network connecting the advertising kiosks. The advantage of having only one processing server with which the advertising kiosk obtains data lies in the greater security provided to the system: by having only one server with which data is exchanged, a specific exchange protocol can be implemented, comprising for example a permanent encryption of the data exchanged. The advantage of having a processing server and an advertising agency server lies in the greater flexibility in the updating of offers by the advertising agency. The advertising agency is not dependent on the processing server to carry out the updating. This makes it necessary however to have available a multimedia kiosk capable of processing both exchanges with the processing server and at the same time exchanges with the advertising agency server, and this can raise problems of security. Thus, the proposed technique in which there is a processing server that acts as a relay with the advertising agency server provides a solution to this problem. The processing server remains alone in an interface with the advertising agency server while the advertising agency server is capable of providing data to the processing server so that it transmits this data to the multimedia kiosk.

Naturally, this architecture is the one that seems to be the most secure. It is however possible that the contactless payment terminal of the multimedia kiosk is directly linked with the processing server. It may be recalled that such a contactless payment terminal possesses its own resources (i.e. secured processor, secured memory, secured interfaces) and its own security devices (i.e. protection against violation, intrusion detector). This means that it is possible and envisaged, in another embodiment, that the multimedia kiosk will engage the contactless payment terminal only during payment operations. This means that it is no longer specifically necessary, in this case, to centralize the management of the updating in the processing server. The payment terminal inserted within the multimedia kiosk then acts upon instructions of a specific module of this kiosk.

Depending on the data received firstly from the advertising agency server or depending on the data preloaded into the multimedia kiosk, this kiosk is then capable of implementing different scenarios of interaction. The first scenario, which is the simplest one, consists of a permanent broadcasting of a single advertisement message and, when all the conditions are met, the offering of a possibility of selling the product or the service that is being promoted. The conditions likely to prompt the sale are the following: a user is detected before the multimedia kiosk and this user possesses a contactless payment means that can serve to pay for his purchase.

This first scenario, with reference to FIG. 1, illustrates the exchanges implemented to make this purchase:
 a user is situated before the multimedia kiosk;
 the multimedia kiosk (BM) detects (100) the presence of the user; this step of detection is achieved for example by means of a signal coming from a sensor, such as for example an infrared sensor or ultrasound sensor or again a combination of signals coming both these sensors;
 the multimedia kiosk (BM), through its interaction management module (ModGI), modifies (110) the display of the common advertisement message into a personalized advertisement message: such a modification can consist of the display of a prompt requesting the user to purchase the item or the service that is being promoted: a message of the following type "would you like to buy XXX" then appears on the screen and the logo of the contactless payment mode can get lit up in anticipation: advantageously, the prompt is positioned at a level such that it faces the user; such a modification can also take account of other aspects such as: the detection of the presence of a smart communications terminal, the time of day, the weather forecast etc.

The user can then decide (115) to purchase or not purchase the item and the service in question. If he decides to purchase it, he must use his contactless payment means (i.e. the bank card or smart communications terminal) and place it against the contactless payment logo. As an alternative, the user can also accept the offer by selecting a "yes" button (displayed on the screen at the same time as the previous message). If he carries out one of these operations, a payment transaction is carried out using the contactless payment terminal, for the purchase of a product or a service subsequent to the display of the personalized advertisement message to said user. The following actions are then implemented:
 the multimedia kiosk (BM) (or the TPSC contactless payment terminal) transmits (120), to the processing server, the data needed by this processing server to create an acceptance profile (PrAc); the acceptance profile is a set of data intended for the payment terminal in order to enable it to carry out a payment transaction; the data transmitted to create this acceptance profile is for example the price, an identifier of the merchant (for example a bank identifier), a product identifier, the payment terminal number; it takes the form of an encrypted file that prevents the data from being accessible;
 the processing server (SRVT) creates (130) the acceptance profile (PrAc) and transmits it (140) to the multimedia kiosk (BM);
 the multimedia kiosk receives (150) this acceptance profile (PrAc) and transmits it to the contactless payment terminal (TPSC);
 concomitantly or subsequently, the multimedia kiosk (BM) (or the contactless payment terminal TPSC) obtains (160) the necessary data (DAT) coming from the payment means (for example name, bank card number, expiry date, cryptogram) in an encrypted manner;
 the contactless payment terminal (TPSC) then performs (170) the transaction and transmits it (180) to the processing server (SRVT).

The transaction is then made in a secured manner between the processing server and the bank server. Such an implementation comprises the following:
 the processing server (SRVT) transmits (190) the transaction to a server of a banking establishment (SRVB) (i.e. the merchant's banking establishment server); in a complementary manner, the processing server (SRVT) logs (195) the transaction (i.e. for example for purposes of accountancy, requirements of proof or purposes of collecting commission or compensation);
 the server of the banking establishment (SRVB) processes (200) the transaction received and informs (210) the processing server (SRVT) of the progress of this transaction (acceptance or rejection of the transaction);
 the processing server (SRVT) informs (220) the multimedia terminal of the performance of the transaction (acceptance or rejection of the transaction);
 the multimedia kiosk informs (230) the user in turn.

Thus, the multimedia terminal interacts with the user in a simple and efficient manner. Naturally, the method presented is a method enabling basic interaction (i.e. purchasing the product presented). However, the interaction management module (ModGI) enables the management of interactions more complex than the one just presented. More particularly, the interaction management module offers the possibility of carrying out the following:

the promotion and sale of a multitude of different products during the day, depending especially on the time of day, the number of people passing before the kiosk etc.;

the promotion and sale of products from different merchants during the day: such a possibility is particularly interesting for an advertising agency which can propose different goods and services during the day for one and the same multimedia kiosk; such a possibility is also promising for a shopping mall, the owner of the multimedia kiosk, which can promote the products and services of the businesses in the shopping mall in different ways;

the promotion and sale of products matching the consumer using the device: when the user has started interacting with the multimedia kiosk, this kiosk can use the interaction management module (ModGI) to go into a question-and-answer type of interaction mode the goal of which is to refine the user's choices;

the promotion and sale of products on promotion and/or with limited quantities during sales and in the case of inventory reduction;

the sale of an item related to the geographical context of the kiosk; indeed, if this kiosk is set up in a stadium or cinema, the interactions can change according to the shows presented.

The interaction management module is also in charge of managing the obtaining of the product or service. Using means that are described here below, the interaction management module (and the multimedia kiosk) inform the user that the payment transaction has been properly executed. However, there is still one problem to be managed: this is the obtaining, by the user, of the product or service ordered. This obtaining must be taken charge of by the interaction management module to prevent the user from feeling deprived or abandoned at the end of the process and the purchase from becoming a disappointment. Several examples can be envisaged, depending on whether the purchase relates to a product or a service and also depending on whether the multimedia kiosk has been set up in a public place (an airport lounge, a railway station lounge, a subway station) or whether it has been set up in a shop.

When the sale relates to a service, hence by definition to one or more intangible actions, the interaction management module has the task of giving the user the means to benefit from the service purchased. As a rule, this task can be achieved by obtaining the user's contact details (in which case modules enabling such contact details to be obtained are used: these are for example modules for interfacing with the user's communications terminal or as a last resort a touchpad appearing on the screen and enabling the user to enter the data). This task can also be achieved by providing the user with a receipt or a proof of purchase so that he can claim the benefit of being provided with a service. In this case, the interaction management module displays, for example in a dedicated space of the screen, one or more pieces of data (for example a 2D code, a watermarked image comprising a concealed code) enabling the user to claim the implementing of the service. This image is captured by the user's communications terminal (for example by means of a photograph). The captured image acts as proof of purchase: this image can thereafter be decoded by a specific device of the merchant (the service provider) so that this service can be implemented to the user's benefit.

When the sale concerns a product, hence by definition one or more material objects, the interaction management module has the task of providing the user with the means to retrieve these objects. Two categories are possible: delivery to the user (using a carrier) or withdrawal from the store (known as 'shop pick-up').

In the case of delivery, the task of the interaction management module can be achieved by obtaining the user's contact details (in which case these modules enabling such contact details to be used are implemented: these are for example modules interfacing with the user's communications terminal or as a last resort, a touchpad appearing on the screen and enabling the user to enter data).

In the event of a 'shop pick-up', two possibilities are offered:

either the multimedia kiosk is set up in the store in question: the user can then take the product directly off the shelf and leave the store;

or the multimedia terminal is set up in a public place: the user then goes to the store to remove the articles purchased.

Whatever the case, the interaction management module displays, for example in a dedicated space of the screen, one or more pieces of data enabling the user to demand that the service be implemented (for example a 2D code, a watermarked image comprising a concealed code). This image is captured by the user's communications terminal (for example through a photograph). The captured image acts as a proof of purchase: this image can thereafter be decoded by a specific device of the merchant (in the pick-up shop) in order to enable products to be withdrawn.

Between the step (160) for obtaining the necessary data (DAT) coming from the payment means and the step (170) for the implementing of the transaction by the payment terminal, an optional step for cancelling the transaction can be implemented. The goal is to enable a user to cancel the order that he has just placed before payment is made. Concretely, the user presents his payment means before the kiosk and this enables the payment terminal (or the kiosk depending on the modes of use) to obtain data. Once this data is obtained, there is no obstacle to carrying out the transaction. Now, it can happen that the user has made a mistake on the purchase he is about to make, either because he has used an inappropriate payment means or because he finally does not wish to make the purchase. To resolve this problem, a time-out step is implemented, during which the user can re-use his payment means to cancel the transaction to be made. More particularly, once the user has used his payment means to make the payment, the interaction management module activates a time-out (for example a time-out of 5 to 10 seconds) and orders the display of a message for cancelling the transaction on the kiosk. The message is displayed at the place where the user had previously placed his payment means. It indicates the possibility of cancelling the transaction and optionally, in real time, indicates the time remaining for the cancellation to be made. During this time, the payment terminal puts itself in a position to receive data. The payment terminal, through the NFC antenna, emits a radio-electrical field. If the user places his payment means again (in order to cancel the purchase), the payment terminal obtains the data on the payment means and compares it with the data previously coming from the payment means.

When the data is identical, the transaction is cancelled (the acceptance profile is eliminated, and the payment terminal eliminates the data of the payment means). The interaction management module then commands the display of the offer that had been previously displayed (i.e. before the start of the transaction).

When the data is different, the transaction is continued: indeed, if the data obtained to cancel the transaction is not the same as the data previously obtained to initiate the transaction, it is probably not the user but a third party that is trying to cancel the transaction. It is therefore assumed that the user does not wish to cancel the transaction.

5.2. Description of a Multimedia Kiosk

Figure 2:
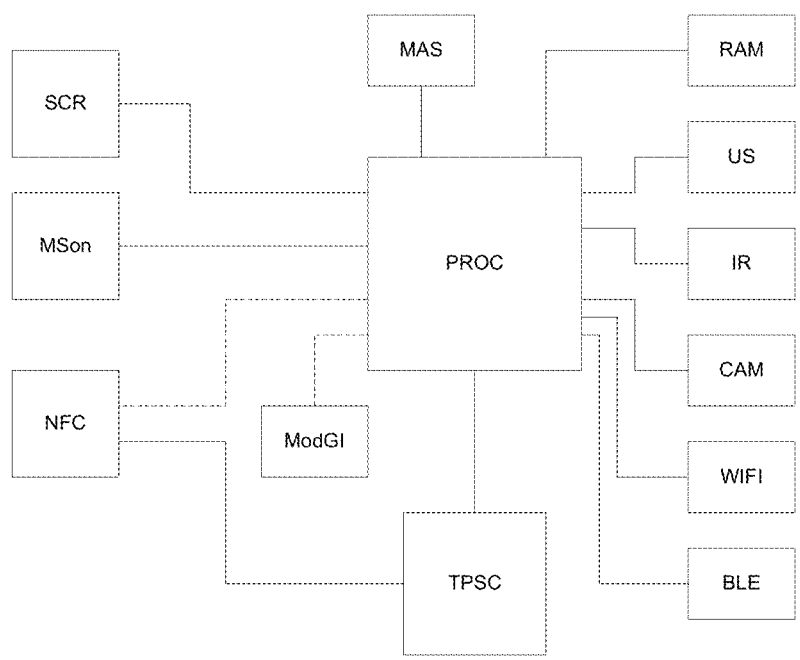
FIG. 2 is a simplified depiction of a multimedia kiosk according to the present technique.

Referring to FIG. 2, we present the architecture of a multimedia kiosk according to the present technique. Such a multimedia kiosk (BM) comprises a screen (Scr), preferably a touch screen. Such a screen is of a size sufficient to enable the display, such that it is visible to passers-by, of one or more advertising messages. Thus, the screen typically has a size of 32 to 55 inches diagonally. A typical advertisement message displayed by such a screen comprises for example a video and/or photographs and/or text.

Depending on the intended environment of the multimedia kiosk (BM), this kiosk can also include a sound-rendering module (MSon): the sound-rendering module is intended to produce sounds that may accompany the advertisement messages sent out, when such sounds can be perceived by the users.

The screen (Scr) and the sound-rendering module (if present) are connected by one or two data transportation buses to a processor (Proc). Such a processor (Proc) has sufficient processing capacity to perform various multimedia processing tasks such as for example the display of a quality video and/or the display of higher-resolution images. The processor (Proc) is furthermore capable of receiving data by means of data transport buses connecting the processor (Proc) to the NFC module (if this module is not directly managed by the integrated payment terminal) or again to the wireless communications modules (such as for example the Wi-Fi module or the Bluetooth module, BLE).

The processor (Proc) is also connected, by means of a data bus, to the sensors (ultrasound US, infrared IR or again a camera CAM) to receive signals emitted by these sensors in order to detect the presence of one or more users. These signals are converted by the transformer and given to the interaction management module (ModGI). The processor also has a random-access memory (RAM) and a mass-storage memory (MAS).

Depending on the embodiments, the processor (Proc) is either driven by the interaction management module (ModGI) in software form (the interaction management module is then a software module under the control of an operating system) or connected to the interaction management module (ModGI) in hardware form. The interaction management module (ModGI) is in charge of receiving data given by the processor to detect the presence of one or more users, obtain data on a product or a service to be proposed, transmit this data to the contactless payment terminal etc.

Throughout the purchasing process, the interaction management module is also capable of informing the user of the progress of this process, for example by displaying personalized data.

Depending on the embodiments, the interaction management module is also capable of interacting with the user by means of a smart communications terminal. To this end, the interaction management module transmits a beacon by means of a Bluetooth interface. This beacon can be picked by the communications terminal. Upon reception of this beacon, the communications terminal is capable of setting up two-way communications with the multimedia terminal.

If the user accepts it (accepts interaction with the multimedia kiosk), this kiosk can then launch a search, for example in the cache memory of the communications terminal. This search is aimed especially at obtaining information on the advertisement messages already encountered by the user, obtaining information on installed applications. Using this information, the interaction management module is capable for example of identifying a loyalty application linked with a brand concerned by an advertisement message that could be of interest to the user. It may be a competing brand or the same brand of product and service. Thus, using a database recorded in the mass memory of the terminal, the module can propose the purchase of a product or a specific service.

Using data obtained in the communications terminal, the interaction management module is capable of obtaining the user's contact details (email address, physical address) or the terminal address details (IMISI, IMEI) so that the user can take possession of or receive the products or services purchased, as was described here above.

Using data obtained in the communications terminal, the interaction management module is finally capable of building proof of purchase (QR code, water-marked image, as explained here above) that integrates an identifier of the communications terminal. Thus, the safety of the transaction is improved from the viewpoint of both the user (who is sure that his purchase is linked to his communications terminal) and the merchant (who can be sure that he has additional proof of the validity of the purchase made by the user).

The invention claimed is:

1. A method comprising:
   processing, by a processor, data displayed on a screen of a multimedia kiosk comprising a contactless payment terminal, wherein the processing is implemented within said multimedia kiosk and comprises:
   detecting, by at least one sensor or wireless communication module, a presence of a user;
   modifying, by an interactive management module after detecting the presence of the user, a common advertisement message, broadcast by said multimedia kiosk, into a personalized advertisement message, wherein modifying the common advertisement message into the personalized advertisement message comprises displaying a prompt asking the user to purchase an item of goods or services being promoted; and
   implementing, by the contactless payment terminal, a payment transaction for purchasing the item subsequent to displaying the prompt to said user, wherein implementing the payment transaction comprises:
   receiving, by the interaction management module, a piece of data representing a user's willingness to make a purchase related to the personalized advertisement message;
   transmitting, to a processing server, data for creating an acceptance profile;
   receiving said acceptance profile to said contactless payment terminal from the processing server;
   obtaining, by the contactless payment terminal and coming from a payment means of the user, data necessary to make a payment;
   implementing a time-out of a pre-determined duration and the payment transaction by the contactless payment terminal; and
   displaying a message providing information on the possibility of cancelling the payment transaction up to the occurrence of either one of the following events:

receiving, by the payment terminal and from the payment means of the user, the same data as the data previously used to make the payment; and elapsing of the pre-determined duration defined by the time-out.

2. The method according to claim 1, further comprising implementing the transaction by the processing server in coordination with a bank server.

3. The method according to claim 2, wherein implementing the transaction by the processing server in coordination with the bank server comprises:

receiving the transaction by the processing server;

transmitting the transaction by the processing server to a bank server;

processing the received transaction by the bank server; and transmitting, by the bank server, a progress of the transaction.

4. The method according to claim 1, wherein modifying the common advertisement message into the personalized advertisement message comprises:

detecting a presence of a smart communications terminal;

transmitting a request for obtaining data to the communications terminal; and when the user accepts the transmission of data:
  modifying said personalized advertisement message as a function of at least one value derived from said received data.

5. The method according to claim 1, wherein detecting the presence of the user comprises obtaining a signal coming from at least one presence sensor of the multimedia kiosk.

6. The method according to claim 1, wherein implementing the payment transaction comprises displaying, on the screen of said multimedia kiosk, a piece of data expressing the purchase made by said user.

7. The method according to claim 1, wherein when the contactless payment terminal receives the same data as the data previously used to make the payment, the method comprises cancelling said payment transaction.

8. A multimedia kiosk comprising:

a screen configured to display data;

a contactless payment terminal configured to implement a payment transaction for purchasing an item subsequent to displaying a prompt on the screen to a user;

a sensor or wireless communication module configured to detect a presence of the user; and a processor configured to modify, by an interaction management module after detecting the presence of the user, a common advertisement message broadcast by said multimedia kiosk into a personalized advertisement message, wherein modifying the common advertisement message into the personalized advertisement message comprises displaying the prompt asking the user to purchase the item of goods or services being promoted;

wherein implementing the payment transaction further comprises:

receiving, by the interaction management module, a piece of data representing a user's willingness to make a purchase related to the personalized advertisement message;

transmitting, to a processing server, data for creating an acceptance profile;

receiving said acceptance profile to said contactless payment terminal from the processing server;

obtaining, by the contactless payment terminal and coming from a payment means of the user, data necessary to make a payment;

implementing a time-out of a pre-determined duration and the payment transaction by the contactless payment terminal; and displaying a message providing information on the possibility of cancelling the payment transaction up to the occurrence of either one of the following events:

receiving, by the payment terminal and from the payment means of the user, the same data as the data previously used to make the payment; and elapsing of the pre-determined duration defined by the time-out.

9. The system according to claim 8, wherein the processing server is configured to implement the transaction in coordination with a bank server.

10. The system according to claim 9, wherein implementing the transaction by the processing server in coordination with the bank server comprises:

receiving the transaction by the processing server;

transmitting the transaction by the processing server to a bank server;

processing the received transaction by the bank server; and transmitting, by the bank server, a progress of the transaction.

11. The system according to claim 8, wherein modifying the common advertisement message into the personalized advertisement message comprises:

detecting a presence of a smart communications terminal;

transmitting a request for obtaining data to the communications terminal; and when the user accepts the transmission of data:
  modifying said personalized advertisement message as a function of at least one value derived from said received data.

12. The system according to claim 8, wherein detecting the presence of the user comprises obtaining a signal coming from at least one presence sensor of the multimedia kiosk.

13. The system according to claim 8, wherein implementing the payment transaction comprises displaying, on the screen of said multimedia kiosk, a piece of data expressing the purchase made by said user.

14. The system according to claim 8, wherein when the contactless payment terminal receives the same data as the data previously used to make the payment, the payment transaction is cancelled.

15. A non-transitory computer-readable medium comprising instructions stored thereon, which when executed on a processor of a multimedia kiosk configure the multimedia kiosk to perform acts comprising:

processing data displayed on a screen of the multimedia kiosk, the multimedia kiosk comprising a contactless payment terminal, wherein the processing comprises:

detecting, by at least one sensor or wireless communication module, a presence of a user;

modifying, by an interactive management module after detecting the presence of the user, a common advertisement message, broadcast by said multimedia kiosk, into a personalized advertisement message, wherein modifying the common advertisement message into the personalized advertisement message comprises displaying a prompt asking the user to purchase an item of goods or services being promoted; and implementing, by the contactless payment terminal, a payment transaction for purchasing the item subsequent to displaying the prompt to said user, wherein implementing the payment transaction comprises:
- receiving, by the interaction management module, a piece of data representing a user's willingness to make a purchase related to the personalized advertisement message;
- transmitting, to a processing server, data for creating an acceptance profile;
- receiving said acceptance profile to said contactless payment terminal from the processing server;
- obtaining, by the contactless payment terminal and coming from a payment means of the user, data necessary to make a payment;
- implementing a time-out of a pre-determined duration and the payment transaction by the contactless payment terminal; and
- displaying a message providing information on the possibility of cancelling the payment transaction up to the occurrence of either one of the following events:
  - receiving, by the payment terminal and from the payment means of the user, the same data as the data previously used to make the payment; and
  - elapsing of the pre-determined duration defined by the time-out.

16. The non-transitory computer-readable medium according to claim 15, further perform acts comprising: implementing the transaction by the processing server in coordination with a bank server.

17. The non-transitory computer-readable medium according to claim 16, wherein implementing the transaction by the processing server in coordination with the bank server comprises:
- receiving the transaction by the processing server;
- transmitting the transaction by the processing server to a bank server;
- processing the received transaction by the bank server; and
- transmitting, by the bank server, a progress of the transaction.

18. The non-transitory computer-readable medium according to claim 15, wherein modifying the common advertisement message into the personalized advertisement message comprises:
- detecting a presence of a smart communications terminal;
- transmitting a request for obtaining data to the communications terminal; and
- when the user accepts the transmission of data:
  - modifying said personalized advertisement message as a function of at least one value derived from said received data.

19. The non-transitory computer-readable medium according to claim 15, wherein detecting the presence of the user comprises obtaining a signal coming from at least one presence sensor of the multimedia kiosk.

20. The non-transitory computer-readable medium according to claim 15, wherein implementing the payment transaction comprises displaying, on the screen of said multimedia kiosk, a piece of data expressing the purchase made by said user.

21. The non-transitory computer-readable medium according to claim 15, wherein when the contactless payment terminal receives the same data as the data previously used to make the payment, the payment transaction is cancelled.

* * * * *